US011623771B2

(12) United States Patent
Davies et al.

(10) Patent No.: US 11,623,771 B2
(45) Date of Patent: Apr. 11, 2023

(54) NANO-SATELLITE

(71) Applicant: ISRAEL AEROSPACE INDUSTRIES LTD., Lod (IL)

(72) Inventors: Daniel Davies, Tel Aviv (IL); Tal Mines, Rishon Lezion (IL); Eli Matza, Herzliya (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 385 days.

(21) Appl. No.: 17/044,883

(22) PCT Filed: Apr. 15, 2019

(86) PCT No.: PCT/IL2019/050425
§ 371 (c)(1),
(2) Date: Oct. 2, 2020

(87) PCT Pub. No.: WO2019/202590
PCT Pub. Date: Oct. 24, 2019

(65) Prior Publication Data
US 2021/0139170 A1    May 13, 2021

(30) Foreign Application Priority Data

Apr. 16, 2018  (IL) .......................... 258729

(51) Int. Cl.
*B64G 1/64*  (2006.01)
*B64G 1/10*  (2006.01)
(Continued)

(52) U.S. Cl.
CPC ............... *B64G 1/641* (2013.01); *B64G 1/10* (2013.01); *B64G 1/443* (2013.01); *B64G 1/645* (2013.01); *B64G 1/66* (2013.01); *B64G 2001/643* (2013.01)

(58) Field of Classification Search
CPC ... B64G 1/641; B64G 2001/643; B64G 1/645
See application file for complete search history.

(56) References Cited

U.S. PATENT DOCUMENTS

| 3,380,687 A | 4/1968 | Wrench et al. |
| 5,411,226 A * | 5/1995 | Jones ..................... B64G 1/641 |
| | | 244/173.3 |

(Continued)

FOREIGN PATENT DOCUMENTS

| CA | 2983494 A1 | 11/2016 |
| CA | 2983497 A1 | 11/2016 |

(Continued)

*Primary Examiner* — Joshua J Michener
*Assistant Examiner* — Michael B. Kreiner
(74) *Attorney, Agent, or Firm* — Dorsey & Whitney LLP

(57) ABSTRACT

A satellite is provided, configured for stacking with another similarly designed satellite and to facilitate separation thereof. The satellite comprises a housing for carrying functional components, having a plurality of pairing arrangements and a separation arrangement. Each of the pairing arrangements comprises a post extending perpendicularly to a horizontal plane of the housing, and first and second guide members. First guide members of the satellite are configured to couple with second guide members of the other satellite when stacked therewith. The separation arrangement comprises a thrust element configured to impart an ejection force to facilitate the separation, and a release assembly configured to selectively facilitate allowing the ejection force to propel one of the satellites, thereby initiating the separation. The first guide member of the satellite cooperates with the second guide member of the other satellite to deflect it from the horizontal plane during separation.

16 Claims, 7 Drawing Sheets

(51) Int. Cl.
*B64G 1/44* (2006.01)
*B64G 1/66* (2006.01)

(56) References Cited

U.S. PATENT DOCUMENTS

| | | | |
|---|---|---|---|
| 5,605,308 A | 2/1997 | Quan et al. | |
| 5,613,653 A | 3/1997 | Bombled et al. | |
| 5,720,450 A | 2/1998 | Kanne | |
| 6,276,639 B1 * | 8/2001 | Hornung | B64G 1/641 244/173.3 |
| 6,296,206 B1 | 10/2001 | Chamness et al. | |
| 6,416,018 B2 * | 7/2002 | DiVerde | B64G 1/002 244/137.1 |
| 6,494,406 B1 * | 12/2002 | Fukushima | B64G 1/645 244/173.3 |
| 6,494,407 B2 * | 12/2002 | Arulf | B64G 1/641 403/333 |
| 6,557,802 B2 * | 5/2003 | Kroeker | B64G 1/645 244/173.3 |
| 6,729,582 B2 | 5/2004 | Beyer | |
| 6,789,767 B2 | 9/2004 | Mueller et al. | |
| 7,219,858 B2 | 5/2007 | Sharer | |
| 8,789,797 B2 | 7/2014 | Darooka | |
| 9,415,883 B2 | 8/2016 | Holemans et al. | |
| 9,463,882 B1 | 10/2016 | Field et al. | |
| 9,718,566 B2 | 8/2017 | Field et al. | |
| 2012/0217348 A1 | 8/2012 | Aguirre | |
| 2016/0046397 A1 | 2/2016 | Aston et al. | |
| 2016/0368625 A1 | 12/2016 | Field et al. | |
| 2018/0111707 A1 * | 4/2018 | Poncet | B64G 1/645 |

FOREIGN PATENT DOCUMENTS

| | | |
|---|---|---|
| EP | 1008516 A1 | 6/2000 |
| FR | 2805245 A1 | 8/2001 |
| JP | S58191700 A | 11/1983 |
| WO | 0009396 A2 | 2/2000 |
| WO | 2016176298 A1 | 11/2016 |
| WO | 2017046497 A1 | 3/2017 |
| WO | 2017055770 A1 | 4/2017 |

* cited by examiner

NANO-SATELLITE

TECHNOLOGICAL FIELD

The presently disclosed subject matter relates to satellites, and in particular to small satellites which may be carried on a launch vehicle with other similar satellites.

BACKGROUND

Small satellites are typically carried towards their orbit on a launch vehicle which carries a plurality of other small satellites. In order to be placed into orbit, each satellite undergoes separation, in which is it dispensed from the launch vehicle with suitable conditions, e.g., at an appropriate location, and at an appropriate velocity and direction, in order to be placed in orbit.

The launch vehicle is often provided with a dispensing system. The dispensing system is configured to accommodate each of the satellites, for example each in its own compartment, and to dispense it with the suitable conditions therefor.

SUMMARY

According to one aspect of the presently disclosed subject matter, there is provided a satellite configured for stacking with another similarly designed satellite and to facilitate separation thereof, the satellite comprising a housing for carrying functional components, the housing further comprising a plurality of pairing arrangements and a separation arrangement; each of the pairing arrangements comprising a post extending perpendicularly to a horizontal plane of the housing, and first and second guide members, first guide members of the satellite being configured to couple with second guide members of the other satellite when stacked therewith; the separation arrangement comprising a thrust element configured to impart an ejection force configured to facilitate the separation, and a release assembly configured to selectively facilitate allowing the ejection force to propel one of the satellites, thereby initiating the separation; wherein the first guide member of the satellite cooperates with the second guide member of the other satellite to deflect it from the horizontal plane during separation.

It will be appreciated that in the presently disclosure and appended claims, the term similarly designed refers to a satellite which shares those features which are disclosed/recited herein, e.g., two satellites may be considered to be similarly designed if they share the features recited in one or more of the appended claims.

The pairing arrangements may be configured such that, when stacked, the weight of an upper of the satellites is borne by the posts of the pairing arrangements of a lower of the satellites.

The first guide member may be configured to receive the second guide member of the other satellite when stacked.

One of the guide members may comprise a throat, the other of the guide members comprising a projection configured to be slidingly received within the throat, the throat and projection each comprising at least one surface tilted with respect to the horizontal axis.

The thrust element may comprise a spring disposed so as to bear upon the other satellite when stacked therewith, thereby imparting the ejection force.

The spring may be mounted with a connection element configured to facilitate a connection to the release assembly of a satellite stacked therewith.

The release assembly may comprise a retention element configured to be received by the connection element of a satellite stacked therewith, and to be selectively released therefrom, thereby allowing the ejection force to propel the satellites and initiate the separation.

The release assembly may comprise a shape-memory alloy configured, in a first state, to facilitate retention of the retention element, and, in a second state, release thereof.

The satellite may be configured to apply a signal to transform the shape-memory alloy from its first state to its second state.

The thrust element may comprise a pyrotechnic separation system.

The housing may comprise sidewalls formed at an angle to one another, and an outer wall having a shape generally conforming to a circular arc subtending the angle. The angle (i.e., formed by the sidewalls) is a divisor of 360°.

The outer wall may comprise one or more planar sections.

The housing may comprise top and bottom covers, at least one of which carries one or more functional components. The functional component may be selected from a group including an antenna assembly and a solar array.

According to another aspect of the presently disclosed subject matter, there is provided a satellite comprising a housing defining an interior space therein, at least a portion of the housing being constituted by one or more functional components (i.e., which have a function beyond that of the housing).

The housing may comprise a top cover and a bottom cover, wherein at least one of a majority of the top cover and a majority of the bottom cover is constituted by the functional components. At least one of the top cover and the bottom cover may be entirely constituted by the functional components.

The functional components may comprise an antenna reflector. The functional components may comprise a solar array.

The satellite may be free of a mechanism to deploy the functional components.

According to a further aspect of the presently disclosed subject matter, there is provided a satellite according to both of the above aspects.

According to a still further aspect of the presently disclosed subject matter, there is provided a base configured for carrying a satellite as per the above first aspect, the base comprising a plurality of guide member, each configured to couple with one of the guide members of the satellite, and a separation arrangement configured to cooperate with one or more elements of the separation arrangement of the satellite to facilitate imparting an ejection force thereon and allowing it to propel it, thereby initiating the separation. The base may be, e.g., part of a launch vehicle, or configured to be mounted thereto.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION

Figure 1A:
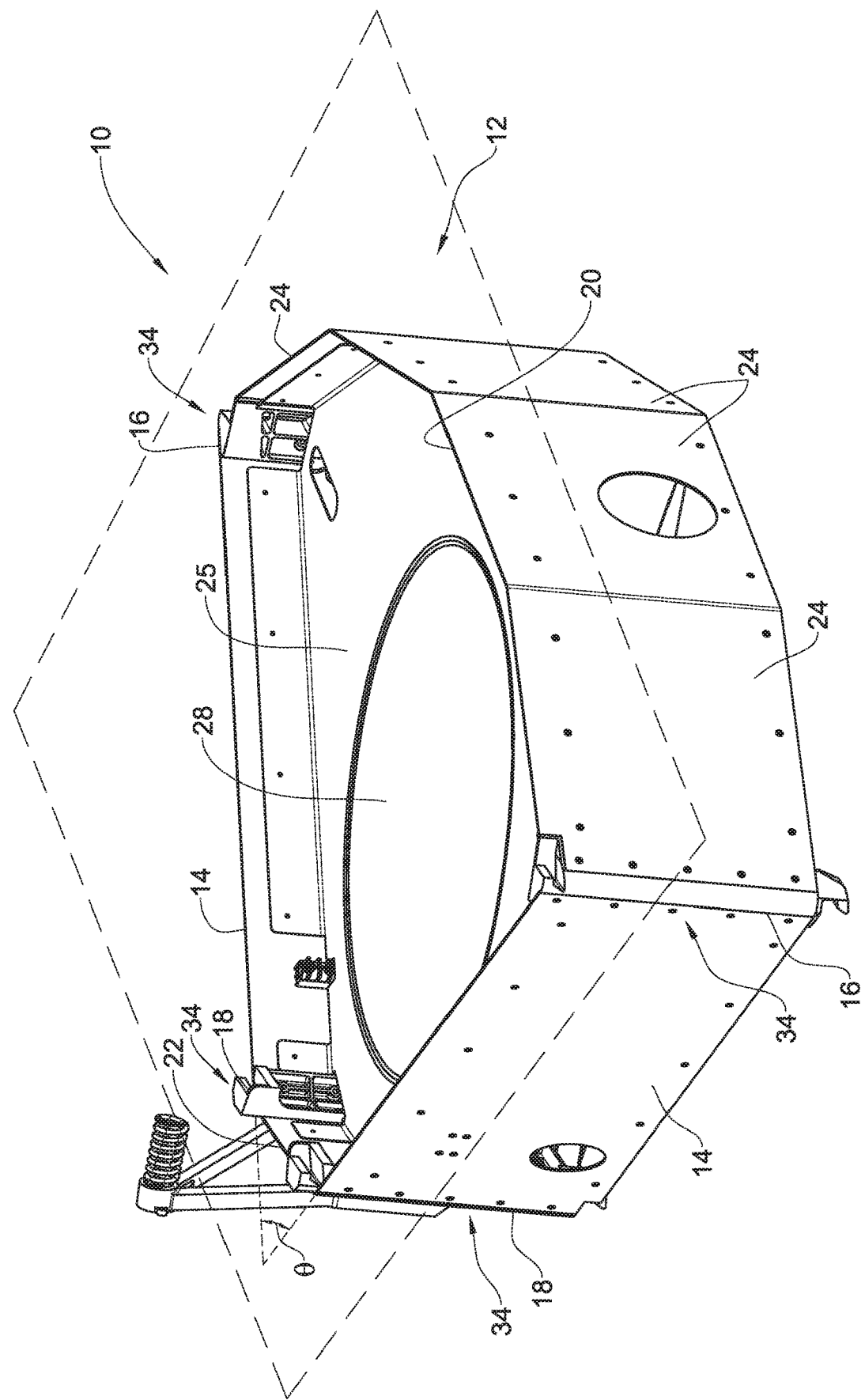
FIGS. 1A and 1B are, respectively, top and bottom perspective views of a satellite according to an example of the presently disclosed subject matter.
Figure 1B:
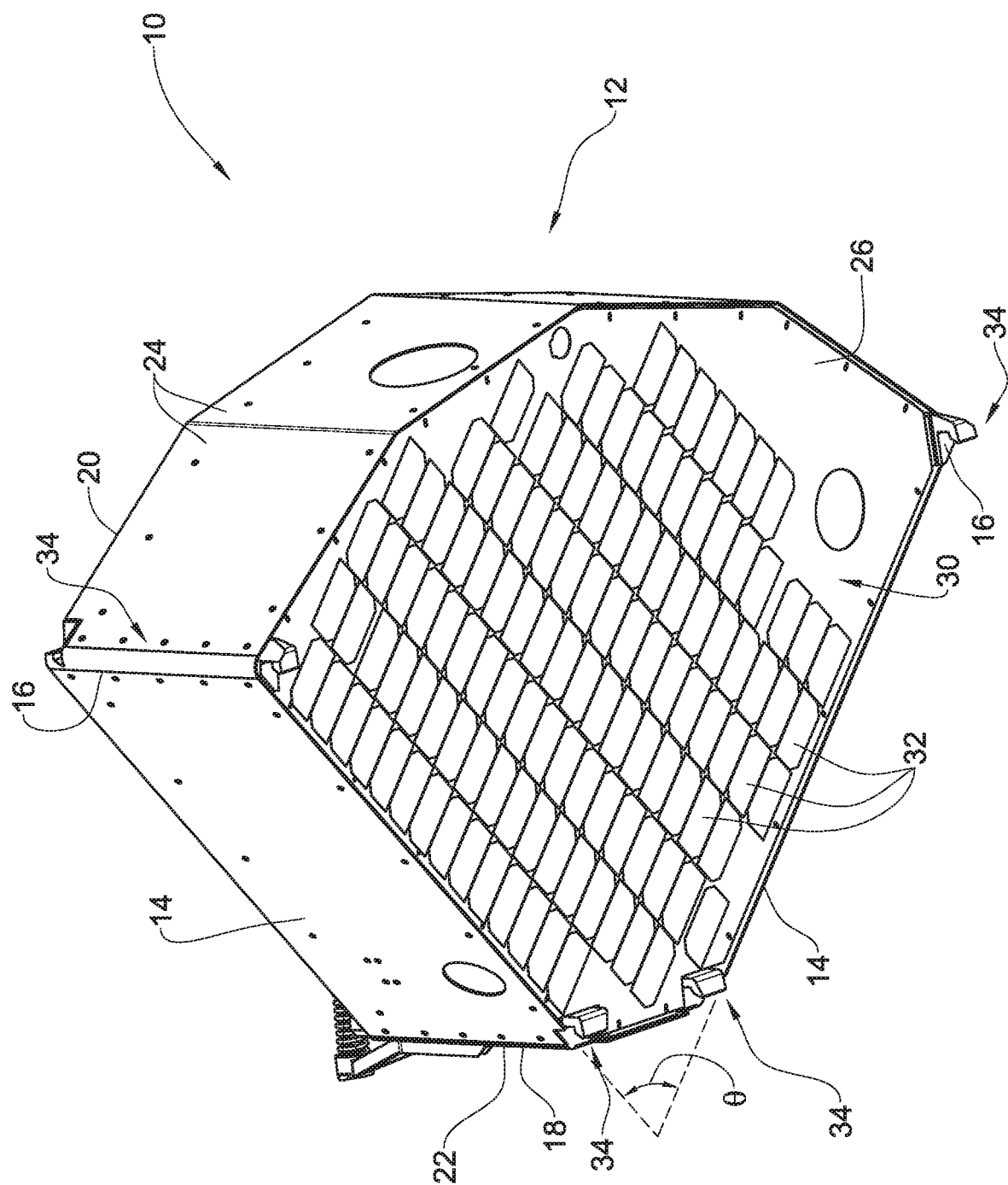

As illustrated in FIGS. 1A and 1B, there is provided a satellite, which is generally indicated at 10. While the satellite 10 described herein with reference to and illustrated in the accompanying drawings is a small satellite, for example designated as a microsatellite, nanosatellite, etc., and the disclosure may be particularly relevant thereto, it will be appreciated that a satellite of any size and/or configuration may be provided in accordance with the presently disclosed subject matter, mutatis mutandis. The satellite 10 comprises a housing 12 and functional components (including, but not limited to, communications equipment, one or more processor, one or more power source units, navigational and/or maneuvering system, etc.; not illustrated in FIGS. 1A and 1B).

Figure 2:
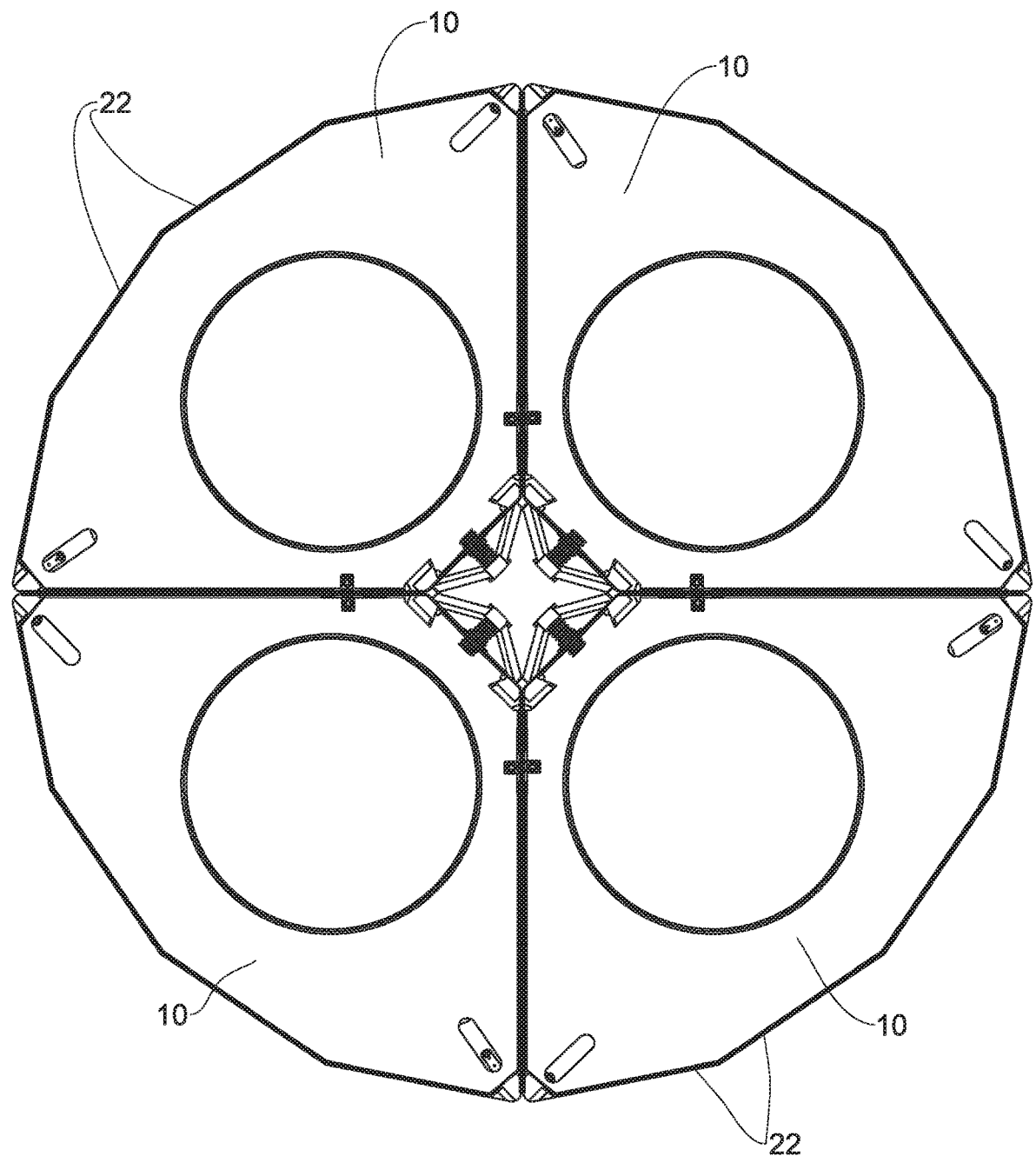
FIG. 2 is a top view of four of the satellites as illustrated in FIGS. 1A and 1B.

The housing 12 comprises two sidewalls 14 forming an angle θ therebetween and extending between outer and inner edges 16, 18 thereof. The angle θ may be a divisor or 360°, i.e., several satellites 10 having the same shape, in particular FIGS. 1A and 1B wherein the sidewalls 14 thereof form the same angle θ, may be arranged adjacent one another without leaving gaps therebetween, for example as illustrated in FIG. 2. (It will be appreciated that in this context, the term divisor is not to be construed in its strictest sense, i.e., as limiting θ to an integer value.)

It will be appreciated that in the presently disclosed subject matter and appended claims, terms indicating direction and/or orientation, such as up, down, front, rear, horizontal, vertical, etc., are used with respect to the example illustrated in and described with reference to the accompanying drawings, and should not be construed as limiting, e.g., to a particular orientation. In particular, the terms outward and inward and related terms refer, respectively, to a direction toward the outer wall 20 (i.e., the launch direction) and toward the inner wall 22.

The housing 12 further comprises an outer wall 20 extending between the outer edges 16 of the sidewalls 14, and an inner wall 22 extending between the inner edges 18 of the sidewalls. The outer wall 20 may generally conform to a circular arc subtending the angle θ. For example, it may comprise one more (e.g., depending on the angle θ) planar sections 24. An advantage of providing the outer wall 20 as planar sections 24 generally conforming to a circular arc, over providing the outer wall in the shape of a circular arc, may be that attaching internal components to a planar surface is more easily accomplished than to a curved surface.

According to some examples, none of the planar sections 24 subtends an angle greater than 36°; according to more specific examples, none subtends an angle greater than 30°; according to more specific examples, none subtends an angle greater than 22.5°; according to more specific examples, none subtends an angle greater than 18°; according to more specific examples, none subtends an angle greater than 15° (i.e., according to the above examples, when several satellites 10 are arranged adjacent one another without leaving gaps therebetween, such as illustrated in FIG. 2, the outer walls 20 thereof form a polygon having, respectively, 10, 12, 16 (as shown in FIG. 2), 20, or 24 sides, thereby approximating a circle).

The housing 12 may further comprise a top cover 25 and a bottom cover 26, defining an interior space therebetween, for example for containing therewithin functional components thereof. The top and/or bottom covers 25, 26 may comprise one or more functional components (e.g., constituting, i.e., serving as, at least a portion of its respective cover) or a portion thereof. For example, the top cover 25 may comprise one or more antenna assemblies 28 (e.g., an antenna reflector) constituting part of or configured to operate in conjunction with communications equipment housed within the interior space of the satellite 10. The bottom cover 26 may comprise a solar array 30, configured to utilize, e.g., sunlight impinging thereon to generate electrical power for the satellite 10, and constituting part of or configured to operate in conjunction with a power source unit housed within the interior space. The solar array 30 may comprise a plurality of photovoltaic cells 32, and/or any other suitable elements.

According to some examples, one or both of the top and bottom covers 25, 26 is entirely constituted by a functional component (for example, an antenna reflector may constitute the top cover, the solar array 30 may constitute the bottom cover, etc.).

It will be appreciated that such an arrangement may reduce the weight of the satellite 10, as the functional component serves, in addition to its function, to define the interior space, thereby partially or wholly obviating the need to provide a dedicated cover. In addition, such an arrangement may obviate the need to provide a mechanism to deploy the functional component once the satellite 10 is in orbit (i.e., no separate mechanism for unfolding a solar array is required), thereby simplifying, and potentially further reducing the weight, of the satellite.

According to some examples, the top and/or bottom cover 25, 26 is spaced from the top and/or bottom edge, respectively, of the sidewalls 14. Accordingly, a cavity is defined between the outer surface of the cover 25, 26 and the sidewalls 14, suitable for receiving therewithin functional components such that they don't protrude vertically beyond the sidewalls 14.

The housing 12 may further comprise a plurality of pairing arrangement, which are generally indicated at 34, configured to facilitate stacking multiple satellites 10 as disclosed herein with reference to and illustrated in the accompanying drawings, and to facilitate independent and/or autonomous separation of each satellite when so stacked.

Figure 3A:
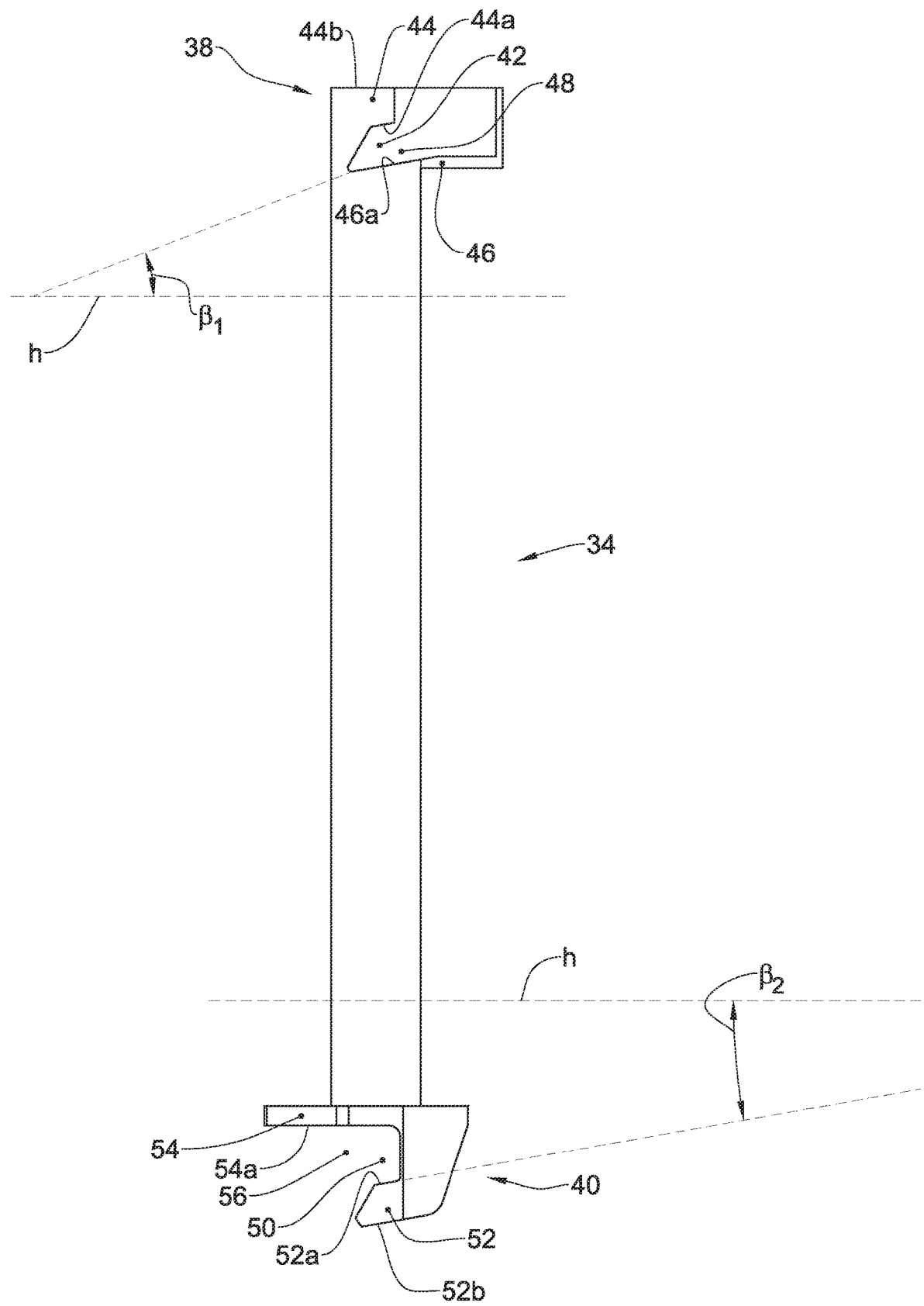
FIG. 3A is a side view of a pairing arrangement of the satellite illustrated in FIGS. 1A and 1B.

As better seen in FIG. 3A, each pairing arrangement 34 comprises a vertical post 36 extending between top and bottom edges of the sidewalls 16 (and/or of outer/inner walls 20, 22) of the housing 12, e.g., substantially perpendicular to a horizontal plane h (indicated in FIG. 1A) of the housing 12. According to some examples, the pairing arrangements 34 are located along the outer and inner edges 16, 18 of the sidewalls 14.

In addition, each pairing arrangement 34 comprises cooperating first and second guide members 38, 40 disposed, respectively, at upper and lower ends thereof. The guide members 38, 40 are configured to couple with one another (i.e., the first guide member with a corresponding second guide member of an adjacent satellite stacked vertically thereupon), thereby facilitating grasping of each satellite by vertically-adjacent ones when stacked, and to influence the path of each satellite during separation, as will be described below.

According to some examples, each of the first guide members 38 comprises an outwardly-facing (i.e., open in a direction generally facing the outer wall 20 of the housing 12) first throat 42 defined between a first projection 44 and a first shelf 46. A bottom surface 44a of the first projection and an upper surface 46a of first shelf 46, i.e., those which define the first throat 42, may be formed at an angle $\beta_1$ with respect to the horizontal plane h of the housing 12, i.e., tilted upwardly toward an opening 48 of the first throat 42. A top surface 44b of the first projection 44 may be substantially planar and parallel with the horizontal plane h of the housing 12. Each of second guide members 40 are formed with a corresponding design, comprising an inwardly-facing (i.e., open in a direction generally facing the inner wall 22 of the housing 12) second throat 50 defined between a second projection 52 and a second shelf 54. Top and bottom surfaces 52a, 52b of the second projection 52 may be formed at an angle ($2 with respect to the horizontal plane h of the housing 12, i.e., tilted downwardly toward an opening 56 of the second throat 50, corresponding to that of the surfaces 44a, 46a of the first guide member 38. A bottom surface 54a of the second shelf 54 may be substantially planar and parallel with the horizontal plane h of the housing 12.

Angles $\beta_1$ and $\beta_2$ may be equal to one another, i.e., the surfaces 44a and 46a defining the first throat 42 may be tilted to the same degree, as are the top and bottom surfaces 52a, 52b of the second throat 52, with respect to the horizontal plane h of the housing 12. Furthermore, as will be described below, the angles $\beta_1$ and $\beta_2$ influence the path the satellite 10 during separation.

The first throat 42 is characterized by a thickness (i.e., the distance between the surfaces 44a, 46a defining it) which is suitable to slidingly receive therein the second projection 52. Similarly, the second throat 50 is characterized by a thickness (i.e., the distance between the top surface 52a of the second projection 52 and the bottom surface 54a of the second shelf 54) which is suitable to slidingly receive therein the first projection 44.

According to some examples, the angles formed by the surfaces 44a, 46a, 52a, 52b with respect to the horizontal plane h of the housing 12 are the same, i.e., each surface is parallel to the one facing it. According to other examples, the surfaces further from the post 36 (i.e., 44a and 52b) may be formed at an angle with respect to the horizontal plane h which is greater than that formed by the surfaces closer to the post (i.e., 46a and 52a), such that the thickness of the first throat 42 decreases along its length in a direction away from its respective opening 48.

Figure 3B:
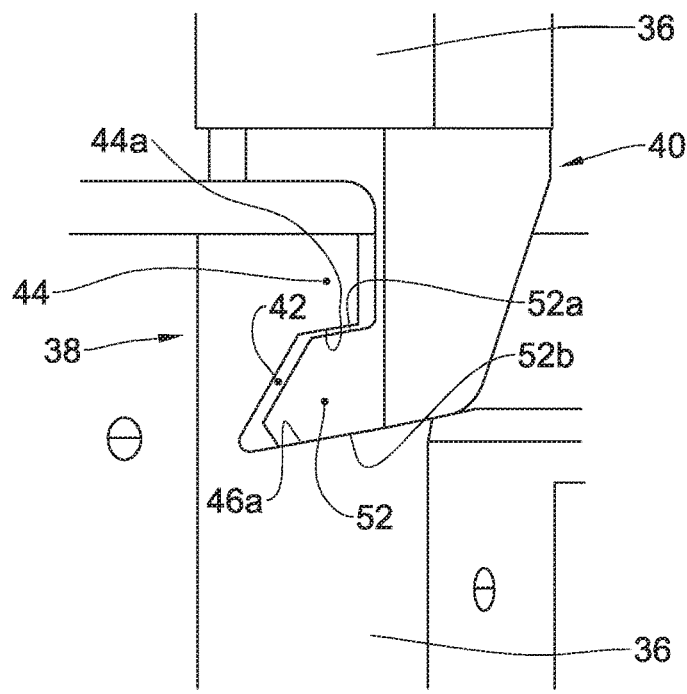
FIG. 3B is a close-up view of guide members of two pairing arrangements, as illustrated in FIG. 3A, coupled with one another.

According to any of the above examples, corresponding surfaces (i.e., those which abut one another when guide members 38, 40 of adjacent satellites 10, when stacked, are coupled, as will be described below) may be formed at the same angle as one another with respect to the horizontal plane h of the housing 12. Accordingly, the bottom surface 44a of the first projection 44 and the top surface 52a of the second projection 52 may be formed at the same angle with respect to the horizontal plane h of the housing 12, and the upper surface 46a of first shelf 46 and the bottom surface 52b of the second projection may be formed at the same angle with respect to the horizontal plane of the housing. It will be appreciated that the two angles may be different from one another. As best seen in FIG. 3B, this facilitates receipt of the second projection 52 within the first throat 42.

Accordingly, the pairing arrangements 34 may be configured to facilitate positioning satellites 10 upon one another, by the coupling of corresponding guide members 38, 40. In addition, they may bearing the weight of satellites thereabove, thereby allowing the rest of the satellite 10 to be made of lighter material which does not have to be capable of bearing the load of satellites stacked thereabove. Furthermore, they may be configured to influence the path of separation, as will be described below.

Figure 4A:
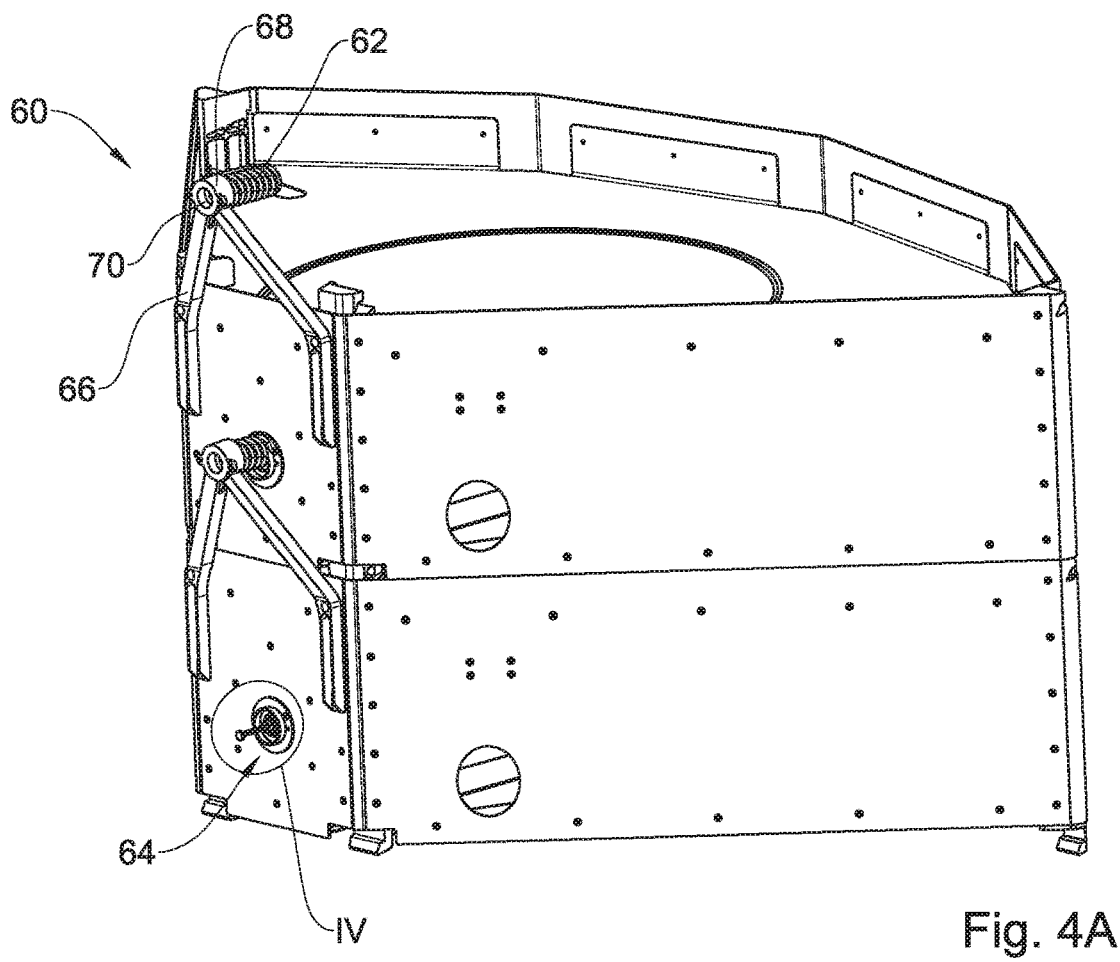
FIG. 4A is a perspective view of two of the satellites illustrated in FIGS. 1A and 1B stacked on one another.

As illustrated in FIG. 4A, the housing 12 is further provided with a separation arrangement, which is generally indicated at 60. The separation arrangement 60 comprises a thrust element 62, such as spring, and a release assembly, generally indicated at 64. The thrust element 62 is configured to cooperate with the release assembly 64 of a different satellite vertically stacked therewith, and to impart an ejection force to a satellite (either the satellite of which it constitutes an element thereof, or one stacked vertically thereon), thereby facilitating separation thereof and deploying it into orbit, as will be described below.

According to some examples, the thrust element 62 is mounted on a carrying member 66, which is configured to position the thrust element in registration with the release assembly 64 of another satellite 10 stacked thereupon (i.e., upon the satellite 10 of which the carrying member is an element). The carrying member 66 may be angled inwardly (i.e., tilted away and inwardly from the inner wall 22), thereby providing clearance for placement of another satellite thereupon. It may comprise a connection element 68, for example comprising a through-going aperture 70, configured to facilitate connection to the release assembly of another satellite stacked thereupon.

The thrust element 62 is disposed on the connection element 68 such that it projects outwardly therefrom such that the thrust element 62 is in an energy storage condition (e.g., according to examples wherein the thrust element is a spring, the energy storage condition is a compressed position of the spring) when another satellite is stacked thereupon.

Figure 4B:
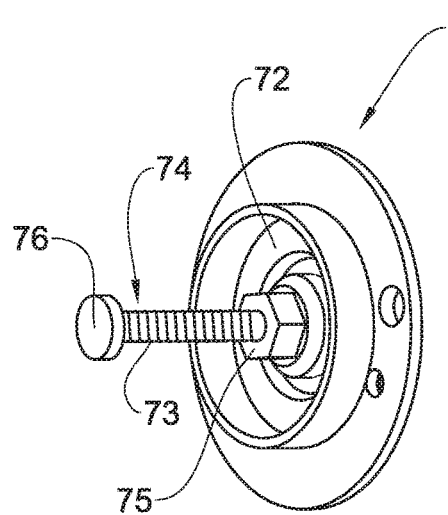
FIG. 4B is a close-up view of the area indicated at IV in FIG. 4A.

As better illustrated in FIG. 4B, the release assembly 64 comprises a seat 72 for accommodating therein the thrust element 62 in its energy storage position, and a retention element 74 configured to be received within a corresponding connection element 68 of a satellite stacked therebelow. The retention element 74 comprises a bulge 76 on its inner end, configured to bear against an inner surface of the connection element 68, while a shaft 73 thereof passes outwardly therethough. The release assembly 64 is configured to selectively release the retention element 74, thereby facilitating utilization of energy stored by the thrust element 62 to deploy a satellite.

According to some examples, the retention element 74 is configured to cooperate with an ejector release mechanism (ERM), for example as provided by TiNi Aerospace. The ERM comprises a nut 75 configured to hold the retention element 74, e.g., the shaft 73 thereof being formed with a thread and being screwingly engaged with the nut. A threaded portion (not illustrated) of the nut 75 comprises at least a portion made from a shape-memory alloy. In its Martensitic phase, the threaded portion of the nut 75 is formed so as to retain the shaft 73 of the retention element 74. The satellite 10 is configured to apply an activation signal (such as an electrical signal, e.g., of 5A for 50 milliseconds), e.g., via an activator of the ERM (not illustrated), at a predetermined time, thereby transforming the shape-memory alloy to its Austenitic phase, thereby releasing the retention element 74, and allowing the satellites 10 to disengage from one another.

According to examples wherein the thrust element 62 is a spring, when the corresponding retention element 74 is released, the spring returns to its rest position, bearing upon the seat 72, and thus the satellite, imparting an outwardly-directed ejection force which facilitates separation of the satellite 10 from the satellite therebelow. A portion of the outwardly-directed ejection force is deflected upwardly by the shape of the guide members 38, 40, in particular as determined by angles $\beta_1$, $\beta_2$ the first throat 42 and second projection 52.

While the thrust element 62 has been described herein with reference to and illustrated in the accompanying drawings as comprising a spring, it may comprise any suitable arrangement, e.g., a pyrotechnic separation system, without departing from the scope of the presently disclosed subject matter, mutatis mutandis.

Figure 5:
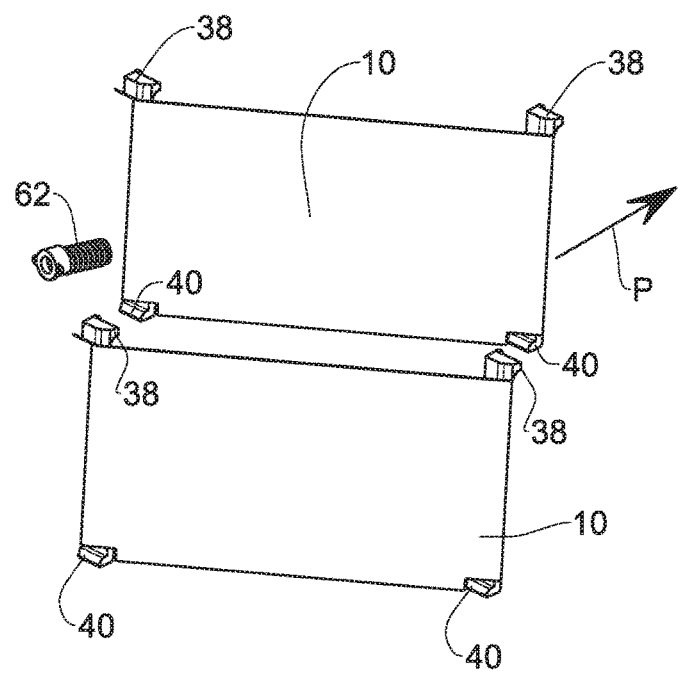
FIG. 5 is a schematic view of a separation of a satellite from a stacked position upon another satellite.

Accordingly, as schematically illustrated in FIG. 5, the path and velocity of the satellite 10 during separation, indicated by arrow p, is based on the ejection force imparted by the thrust element 62 (e.g., based on its spring parameters), and the angles $\beta_1$, $\beta_2$ the first throat 42 and second projection 52 of the guide members 38, 40. Thus, the thrust elements 62 and guide members 38, 40 are designed based on and in order to facilitate the separation of the satellite to conform to predetermined orbit parameters (e.g., the path of the orbit, speed, etc.). Thrust elements 62 of different satellites 10 in the same stack may have different parameters, i.e., such that some or all of the satellites orbit with different velocities (e.g., in order to reduce the chances of collision therebetween). It will be appreciated that such a separation is in a radial direction from its launch vehicle; accordingly, separation may take place without requiring the launch vehicle to significantly slow and/or stop.

It will be appreciated that while the separation arrangement 60 has been described herein with reference to and illustrated in the accompanying drawings as comprising a thrust element 62 configured to cooperate with a release assembly 64 of a satellite 10 stacked vertically thereupon for launching thereof, the elements of the separation arrangement may be arranged in any suitable manner without departing from the scope of the presently disclosed subject matter, mutatis mutandis. According to different examples, the thrust element 62 may constitute an element of the upper satellite and the release assembly 64 an element of the lower satellite, both may constitute elements of the same satellite, each of the satellites may comprise elements of the same satellite (either upper or lower), etc.

In addition, it will be appreciated that while the elements of the separation arrangement 60 have been described herein with reference to and illustrated in the accompanying drawings as being located on the inner side of the satellite 10, they may be disposed on any suitable locations thereof, mutatis mutandis. For example, they may be formed on the guide members 38, 40, e.g., within one or more of the throats 42, 50, one or more of the projections 44, 52, etc.

Figure 6:
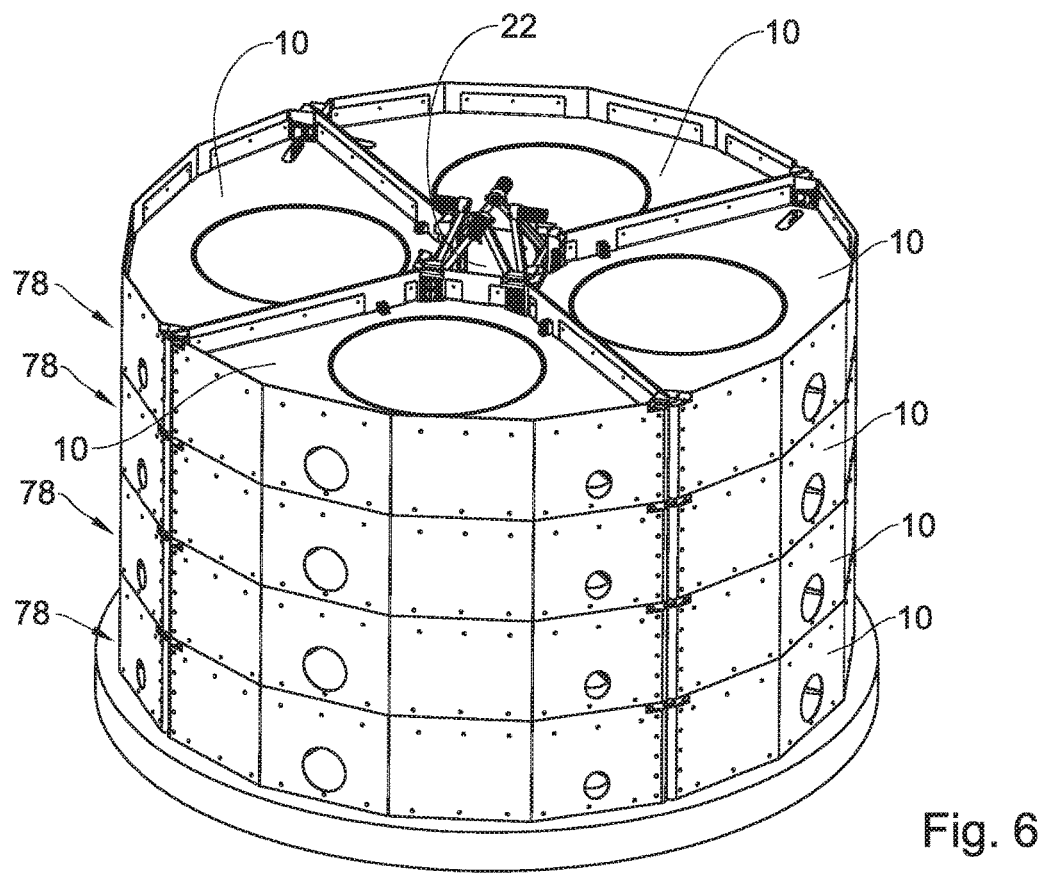
FIG. 6 is a perspective view of a plurality of satellites as illustrated in FIGS. 1A and 1B stacked and arranged in layers.

As illustrated in FIG. 6, a plurality of satellites 10 may be arranged in several layers 78, each layer comprising a plurality of satellites arranged in a ring. The inner walls 22 of the satellites 10 define a space, into which an additional object may be placed, e.g., a payload, a satellite according to a different design, etc. It will be appreciated that the satellites may be designed according to parameters of the launch vehicle, for example to fit therewithin, to accommodate an additional object placed in the space between the inner walls 22, etc. In addition, the satellites 10 may be configured such that separation of each of the satellites occurs at a predetermined time (e.g., according to a predetermined sequence), thereby facilitating placement of each satellite into a predetermined orbit autonomously.

It will be appreciated that while the satellite 10 is described herein with reference to and illustrated in the accompanying drawings as having a conforming to a shape constituting a portion of a circle, it may be formed in any suitable shape. According to some examples, it may constitute a portion of a square, triangle, etc. According to other examples, each satellite is a complete circle, for example constituting a complete layer 78 of the arrangement described above with reference to and illustrated in FIG. 6.

Furthermore, while an example has been illustrated of an arrangement of satellites 10, the sidewalls 14 of each form the same angle $\theta$, satellites characterized by different angles $\theta$ may be provided and arranged together, mutatis mutandis. While the total angles $\theta$ characterizing the satellites 10 in a single layer 78 may equal 360°, according to some modifications the total may be less. According to some examples, one or more pairing arrangements 34 may be provided between the walls 14, 20, 22, passing through the space defined between the top and bottom covers 25, 26.

Similarly, satellites 10 may be provided having different heights, such that some extend beyond a single layer 78, or that no clear layers are defined by the arrangement, mutatis mutandis.

Figure 7:
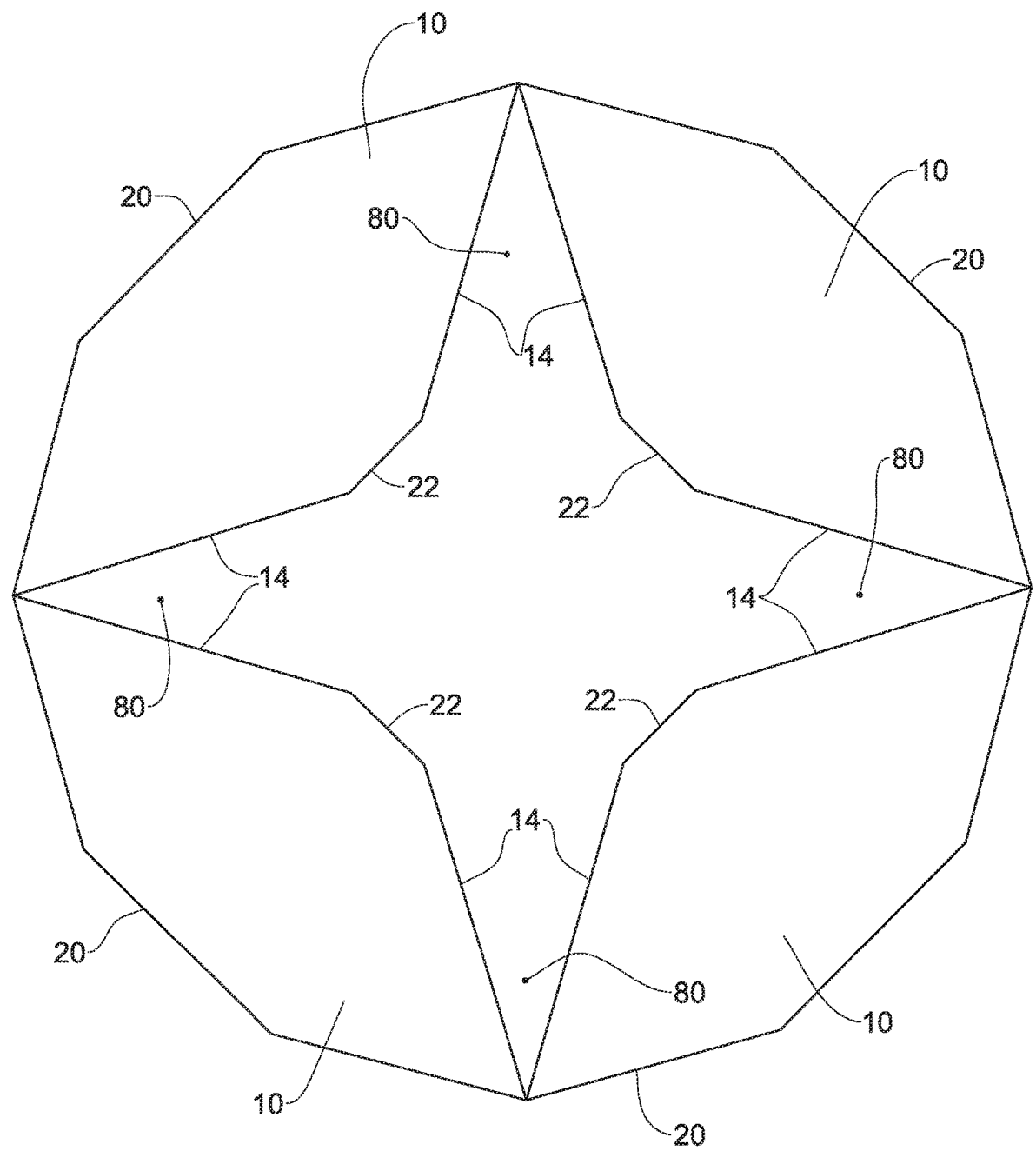
FIG. 7 is a top view of four satellites according to another example of the presently disclosed subject matter.

According to some examples, such as is illustrated schematically in FIG. 7, the outer wall 20 conforms to a circular arc which subtends an angle which is less the angle $\theta$ formed between the sidewalls 14. Accordingly, when a plurality of such satellites 10 are arranged such that the outer walls 20 thereof conform to a circular shape, sidewalls 14 of adjacent satellites diverge inwardly, such that they do not abut one another along their lengths, giving rise to gaps 80 therebetween. Such an arrangement may be suitable, e.g., to suit requirements associated with the functional components and/or other contents of the satellite, to utilize the gaps, for example to provide insulation, damping elements, etc. between adjacent satellites, to accommodate additional payloads, such as satellites, etc., or for any other suitable purpose, mutatis mutandis.

Those skilled in the art to which this invention pertains will readily appreciate that numerous changes, variations, and modifications can be made without departing from the scope of the presently disclosed subject matter, mutatis mutandis.

The invention claimed is:

1. A satellite configured for stacking with another similarly designed satellite and to facilitate separation thereof, the satellite comprising:
   a housing for carrying functional components, the housing including a plurality of pairing arrangements and a separation arrangement;
   wherein each of said plurality of pairing arrangements includes a post extending perpendicularly to a horizontal plane of the housing, and first and second guide members, the first guide members of the satellite being configured to couple with second guide members of the other satellite when stacked therewith;
   wherein said separation arrangement includes a thrust element configured to impart an outwardly-directed ejection force configured to facilitate the separation, and a release assembly configured to selectively facilitate allowing said ejection force to propel one of said satellites, thereby initiating the separation;

wherein the first guide member of the satellite cooperates with the second guide member of the other satellite to deflect a portion of said ejection force from said horizontal plane at an acute angle during separation.

2. The satellite according to claim 1, wherein said plurality of pairing arrangements are configured such that, when stacked, the weight of an upper of said satellites is borne by the posts of the pairing arrangements of a lower of said satellites.

3. The satellite according to claim 1, wherein said first guide member is configured to receive the second guide member of the other satellite when stacked.

4. The satellite according to claim 3, wherein one of said first or second guide members includes a throat, the other of said first or second guide members includes a projection configured to be slidingly received within said throat, each of said throat and said projection each including at least one surface tilted with respect to the horizontal axis.

5. The satellite according to claim 1, wherein said thrust element includes a spring disposed so as to bear upon the other satellite when stacked therewith, thereby imparting the ejection force.

6. The satellite according to claim 5, wherein said spring is mounted with a connection element configured to facilitate a connection to the release assembly of a satellite stacked therewith.

7. The satellite according to claim 6, wherein said release assembly includes a retention element configured to be received by said connection element of a satellite stacked therewith, and to be selectively released therefrom, thereby allowing said ejection force to propel the satellites and initiate the separation.

8. The satellite according to claim 7, wherein said release assembly includes a shape-memory alloy configured, in a first state, to facilitate retention of the retention element, and, in a second state, release thereof.

9. The satellite according to claim 8, being configured to apply a signal to transform said shape-memory alloy from its first state to its second state.

10. The satellite according to claim 1, wherein said thrust element includes a pyrotechnic separation system.

11. The satellite according to claim 1, wherein said housing includes sidewalls formed at an angle to one another, and an outer wall having a shape generally conforming to a circular arc subtending said angle.

12. The satellite according to claim 11, wherein said angle is a divisor of 360°.

13. The satellite according to claim 11, wherein said outer wall includes one or more planar sections.

14. The satellite according to claim 1, wherein said housing includes top and bottom covers, at least one of which carries one or more functional components.

15. The satellite according to claim 14, wherein said functional component is selected from a group including an antenna assembly and a solar array.

16. A base configured for carrying a satellite according to claim 1, wherein said base includes a plurality of guide members, each of the plurality of guide members configured to couple with one of the first or second guide members of the satellite, and a separation arrangement configured to cooperate with one or more elements of the separation arrangement of the satellite to facilitate imparting an ejection force thereon and allowing it to propel it, thereby initiating the separation.

* * * * *